United States Patent
Ito

(10) Patent No.: US 10,848,637 B1
(45) Date of Patent: Nov. 24, 2020

(54) IMAGE PROCESSING APPARATUS AND DETERMINATION METHOD

(71) Applicant: TOSHIBA TEC KABUSHIKI KAISHA, Shinagawa-ku, Tokyo (JP)

(72) Inventor: Shinsaku Ito, Yokohama Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/568,592

(22) Filed: Sep. 12, 2019

(51) Int. Cl.
*H04N 1/203* (2006.01)
*G06T 5/50* (2006.01)
*H04N 1/00* (2006.01)

(52) U.S. Cl.
CPC ....... *H04N 1/2036* (2013.01); *H04N 1/00167* (2013.01); *G06T 5/50* (2013.01)

(58) Field of Classification Search
CPC ........... H04N 5/23206; H04N 5/23229; H04N 1/00029; H04N 1/2166; H04N 2201/218; H04N 1/00204; H04N 1/0097; H04N 1/00973; H04N 2201/0034; H04N 2201/0098; H04N 5/23212; H04N 5/23293; H04N 19/115; H04N 19/117; H04N 19/164; H04N 19/85; H04N 1/00411; H04N 2201/0094; G06T 1/0014; G06T 7/73; G06T 11/60; G06T 15/08; G06T 2200/24; G06F 19/321; G06F 3/0346; G06F 3/1204; G06F 3/1205; G06F 3/1253; G06F 3/1271; G06F 3/1273; G06F 3/1285; G09B 23/28; G06Q 10/10

USPC ......................................................... 358/471
See application file for complete search history.

(56) References Cited

U.S. PATENT DOCUMENTS

| | | | |
|---|---|---|---|
| 6,567,983 B1 * | 5/2003 | Shiimori | H04N 1/00198 709/203 |
| 6,888,646 B1 * | 5/2005 | Sawada | H04N 1/6033 358/1.9 |
| 8,613,082 B2 * | 12/2013 | Aono | G06F 21/105 726/21 |
| 2003/0048272 A1 * | 3/2003 | Gormish | G09G 5/26 345/428 |

(Continued)

FOREIGN PATENT DOCUMENTS

JP 2013-043297 A 3/2013

*Primary Examiner* — Negussie Worku
(74) *Attorney, Agent, or Firm* — Foley & Lardner LLP

(57) ABSTRACT

An image processing apparatus performs multiple image processes on target image information. The image processing apparatus has a control unit. The plurality of image processes include a first image process group including first image processes, and a second image process group including second image processes. The second image processes do not overlap with the first image processes. The control unit performs the first image processes included in the first image process group on the target image information, causes a first storage unit to store the target image information on which the first image processes included in the first image process group are performed, as first history information, performs the second image processes included in the second image process group on the target image information on which the first image processes included in the first image process group are performed, and outputs the first history information to a hardware resource.

19 Claims, 8 Drawing Sheets

(56) References Cited

U.S. PATENT DOCUMENTS

| | | | | |
|---|---|---|---|---|
| 2003/0095197 A1* | 5/2003 | Wheeler | .................. | H04N 1/40 |
| | | | | 348/241 |
| 2003/0202195 A1* | 10/2003 | Ito | ............................ | G06T 7/13 |
| | | | | 358/1.9 |
| 2004/0174565 A1* | 9/2004 | Ito | ........................ | H04N 1/4072 |
| | | | | 358/2.1 |
| 2005/0226530 A1* | 10/2005 | Murayama | .............. | G06T 11/60 |
| | | | | 382/276 |
| 2006/0203290 A1* | 9/2006 | Ito | ........................ | H04N 1/2369 |
| | | | | 358/3.1 |
| 2007/0292041 A1* | 12/2007 | Ito | ............................ | G06T 5/20 |
| | | | | 382/254 |
| 2008/0260260 A1* | 10/2008 | Yamamoto | ............... | G06K 9/46 |
| | | | | 382/209 |
| 2008/0309984 A1* | 12/2008 | Minami | ............... | H04N 1/2166 |
| | | | | 358/301 |
| 2012/0327488 A1* | 12/2012 | Ito | ...................... | H04N 1/40012 |
| | | | | 358/530 |
| 2016/0117632 A1* | 4/2016 | Ito | ........................ | G06Q 10/087 |
| | | | | 705/28 |
| 2018/0307713 A1* | 10/2018 | Shin | ........................ | G06F 16/219 |
| 2019/0116279 A1* | 4/2019 | Ishihara | ................. | G06F 3/1204 |

* cited by examiner

IMAGE PROCESSING APPARATUS AND DETERMINATION METHOD

FIELD

Embodiments described herein relate generally to an image processing apparatus and a determination method.

BACKGROUND

When a defect occurs in any of a number of image processes performed on image information of a target image, the cause of the defect may be specified based on the image information after the image processes. However, it is often difficult to specify the cause based on image information on which the number of image processes is performed.

DETAILED DESCRIPTION

Figure 1:
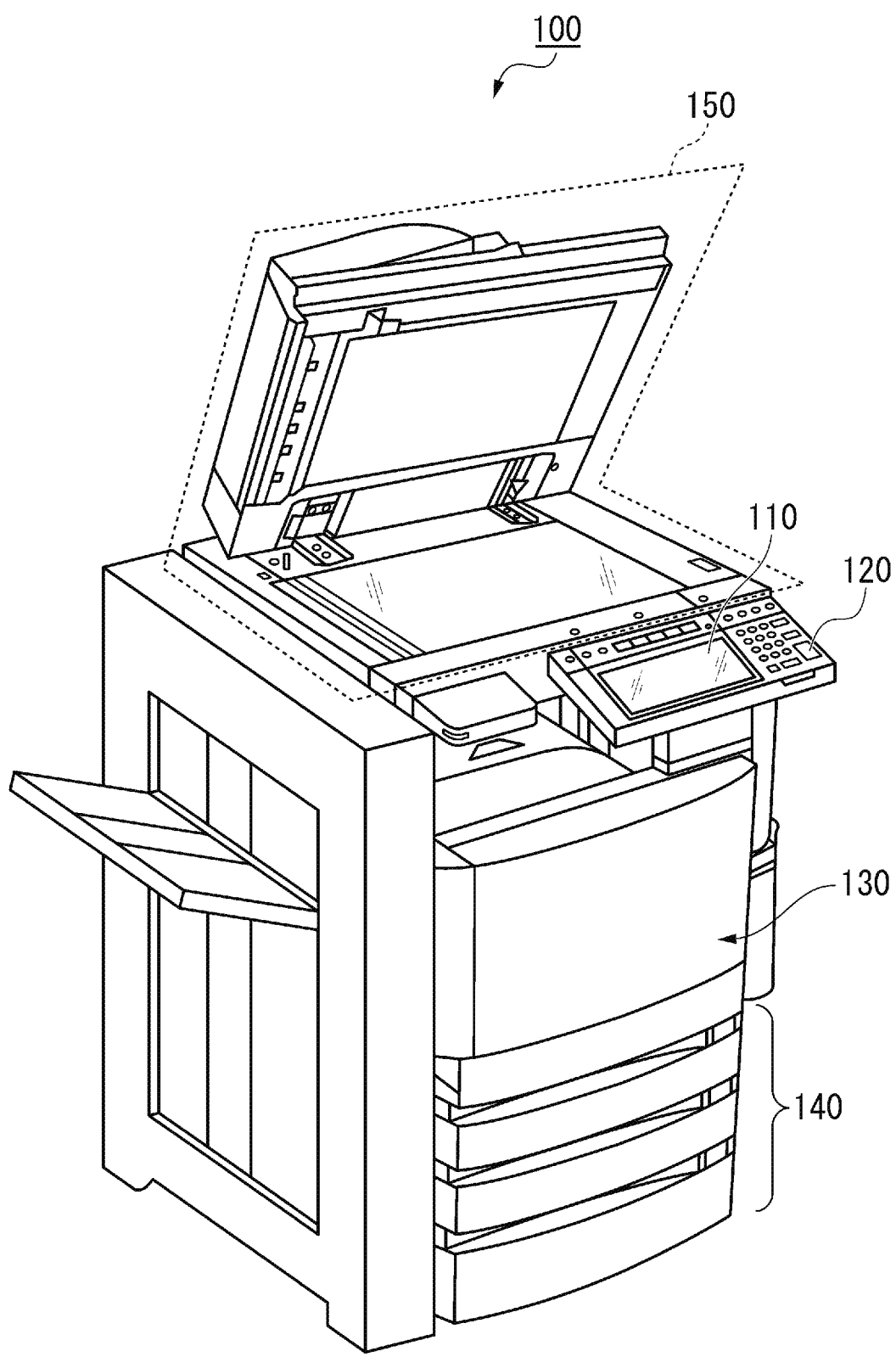
FIG. 1 is an external view illustrating an example of an overall configuration of an image processing apparatus according to an embodiment.

In general, according to one embodiment, an image processing apparatus performs a plurality of image processes on target image information with image information of a target image as the target image information. The image processing apparatus has a control unit. The plurality of image processes include a first image process group including one or more first image processes, and a second image process group including one or more second image processes. The one or more second image processes do not overlap with the one or more first image processes. The control unit performs all the first image processes included in the first image process group on the target image information, causes a first storage unit to store the target image information on which all the first image processes included in the first image process group are performed, as first history information, performs all the second image processes included in the second image process group on the target image information on which all the first image processes included in the first image process group are performed, and outputs the first history information to a hardware resource, and the hardware resource at least temporarily holds the first history information.

Hereinafter, an image processing apparatus according to an embodiment will be described with reference to drawings. In each drawing, the same reference numeral is given to the same configuration. Hereinafter, an image processing apparatus 100 will be described as an example of the image processing apparatus according to the embodiment.

(Details of Image Processing Apparatus)

Hereinafter, the details of the image processing apparatus 100 will be described with reference to FIG. 1.

FIG. 1 is an external view illustrating an example of an overall configuration of the image processing apparatus 100 according to the embodiment. The image processing apparatus 100 is an apparatus that performs image processes, such as a multifunctional machine, a scanner, and a facsimile (FAX). Image processes are processes relating to an image. The image processes include, for example, a process of forming an image on a sheet, a process of reading image information to be read, a process of recording (storing) image information, a process of transmitting an image to another apparatus, and the like.

The image processing apparatus 100 includes a display 110, a control panel 120, a printer unit 130, a sheet accommodating unit 140, and an image reading unit 150. The printer unit 130 of the image processing apparatus 100 may be a device for fixing a toner image or an inkjet device.

The image processing apparatus 100 reads an image appearing on a sheet, generates digital data, and generates an image file. The sheet is, for example, an original document, paper on which characters, images, and the like are described, or the like. The sheet may be anything as long as the thing can be read by the image processing apparatus 100.

The display 110 is an image display device such as a liquid crystal display, an organic electro luminescence (EL) display, or the like. The display 110 displays various types of information on the image processing apparatus 100.

The control panel 120 has a plurality of buttons. The control panel 120 receives a user's operation. The control panel 120 outputs a signal corresponding to the operation performed by the user to the control unit of the image processing apparatus 100. The display 110 and the control panel 120 may be configured as an integral touch panel.

The printer unit 130 forms an image on a sheet based on the image information generated by the image reading unit 150 or the image information received via a communication path. The printer unit 130 forms an image by the following processes, for example. The image forming unit of the printer unit 130 forms an electrostatic latent image on a photosensitive drum based on the image information. The image forming unit of the printer unit 130 forms a visible image by attaching the developer to the electrostatic latent image. A specific example of the developer is a toner. A transfer unit of the printer unit 130 transfers the visible image onto the sheet. A fixing unit of the printer unit 130 fixes the visible image on the sheet by heating and pressurizing the sheet. The sheet on which an image is to be formed may be a sheet stored in the sheet accommodating unit 140 or may be a sheet set by hand.

The sheet accommodating unit 140 stores a sheet used for image formation in the printer unit 130.

The image reading unit 150 reads image information to be read as brightness and darkness of light. The image reading unit 150 records the read image information. The recorded image information may be transmitted to another information processing device via the network. The recorded image information may be formed as an image on the sheet by the printer unit 130.

(Functional Configuration of Image Processing Apparatus)

Hereinafter, a functional configuration of the image processing apparatus 100 will be described with reference to FIG. 2.

Figure 2:
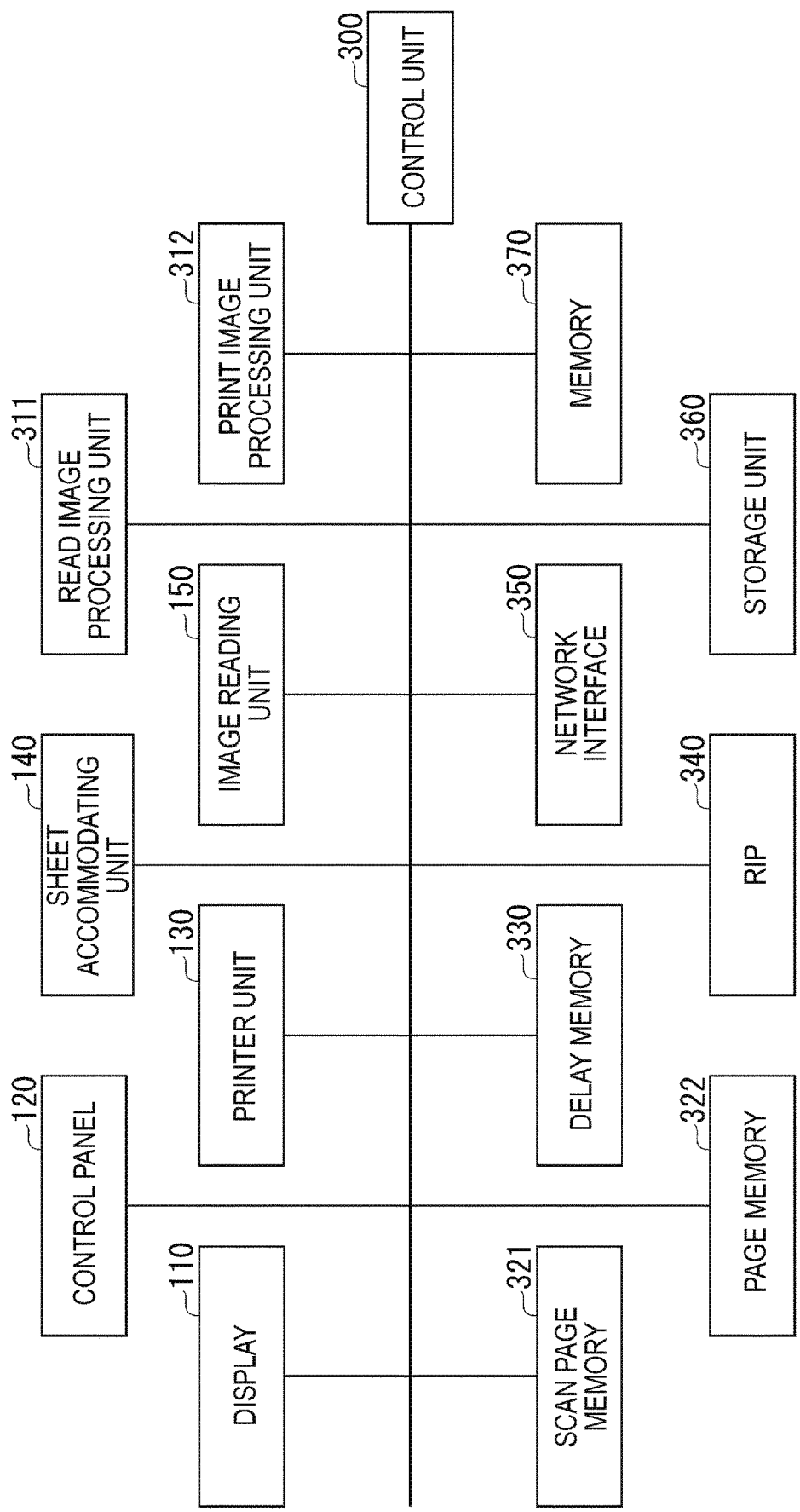
FIG. 2 is a view illustrating an example of a functional configuration of the image processing apparatus.

FIG. 2 is a view illustrating an example of the functional configuration of the image processing apparatus 100.

The image processing apparatus 100 includes the display 110, the control panel 120, the printer unit 130, the sheet accommodating unit 140, and the image reading unit 150. The image processing apparatus 100 further includes a control unit 300, a read image processing unit 311, a print image processing unit 312, a scan page memory 321, and a page memory 322. The image processing apparatus 100 further includes a delay memory 330, a raster image processor (RIP) 340, a network interface 350, a storage unit 360, and a memory 370. These respective functional units included in the image processing apparatus 100 are communicably connected via a system bus.

The display 110, the control panel 120, the printer unit 130, the sheet accommodating unit 140, and the image reading unit 150 are the same as those described above, and thus the description thereof is omitted. The control unit 300, the read image processing unit 311, the print image processing unit 312, the scan page memory 321, the page memory 322, the delay memory 330, the RIP 340, the network interface 350, the storage unit 360, and the memory 370 are described below. One or both of the read image processing unit 311 and the print image processing unit 312 may be included in the control unit 300. In addition, one or both of the scan page memory 321 and the page memory 322 may be included in the control unit 300. In addition, one or both of the delay memory 330 and the RIP 340 may be included in the control unit 300. In addition, the storage unit 360 is an example of a first storage unit.

The control unit 300 is an example of a control unit of the image processing apparatus 100. The control unit 300 includes a central processing unit (CPU) of the image processing apparatus 100. The control unit 300 controls the operation of each functional unit of the image processing apparatus 100. The control unit 300 executes various processes by executing a program. The control unit 300 acquires an instruction input by the user from the control panel 120. That is, the control unit 300 receives an operation from the user via the control panel 120. The control unit 300 executes a control process based on the acquired instruction.

The read image processing unit 311 performs one or more image processes on the image information read by the image reading unit 150. In the following, for convenience of description, one or more image processes performed on the image information by the read image processing unit 311 will be described collectively as a read image process group. That is, the read image process group includes the one or more image processes. In the following, for convenience of description, each image process included in the read image process group will be described as a read image process. In the following, for convenience of description, image information on which all read image processes included in the read image process group are performed by the read image processing unit 311 will be described as information after read image process.

The individual read image process included in the read image process group may be any process as long as the process is performed on the image information read by the image reading unit 150. For example, the individual read image process included in the read image process group is a process of correcting the characteristics of the image reading unit 150 or the like. In the following, as an example, a case will be described in which six image processes of a color conversion process, a filtering process, an enlargement process, a reduction process, a density conversion process, and a compression process are included in the read image process group.

The color conversion process included in the read image process group is a process of converting the color space of the image information read by the image reading unit 150 into a predetermined color space. For example, the color conversion process included in the read image process group is a process of converting a color space of image information from RGB (Red Green Blue) to sRGB.

The filtering process included in the read image process group is a process of applying various filters to the image information read by the image reading unit 150. For example, the various filters include filters such as a filter that emphasizes the edge of the image information.

The enlargement process included in the read image process group is a process of enlarging the image size of the image information read by the image reading unit 150 to a predetermined image size.

The reduction process included in the read image process group is a process of reducing the image size of the image information read by the image reading unit 150 to a predetermined image size.

The density conversion process included in the read image process group is a process of converting the density of the image of the image information read by the image reading unit 150 into a predetermined density.

The compression process included in the read image process group is a process of compressing the data size of the image information read by the image reading unit 150 into a predetermined data size.

In the present embodiment, the read image processing unit 311 is configured with hardware. For example, the read image processing unit 311 is configured with an application specific integrated circuit (ASIC). The read image processing unit 311 may be configured with a program executed by the CPU included in the control unit 300.

In response to a request from the control unit 300, the print image processing unit 312 performs one or more image processes on the image information indicated by the request. In addition, the print image processing unit 312 performs, on the image information, the one or more image processes as a pre-process for forming an image of the image information on a sheet by the printer unit 130. For example, the print image processing unit 312 performs the one or more image processes on the information after read image process described above. In the following, for convenience of description, the one or more image processes will be described collectively as a print image process group. That is, the print image process group includes the one or more image processes. In the following, for convenience of description, each image process included in the print image process group will be described as a print image process. In the following, for convenience of description, image information on which all print image processes included in the print image process group are performed by the print image processing unit 312 will be described as information after print image process.

Each print image process included in the print image process group may be any process as long as the process is performed on the image information indicated by the request from the control unit 300. In the following, as an example, a case will be described in which seven image processes of a color conversion process, a filtering process, an enlargement process, a reduction process, a density conversion process, a black signal generation process, a gamma correction process, and a halftone process are included in the print image process group.

The color conversion process included in the print image process group is a process of converting a color space of image information into a predetermined color space. For example, the color conversion process included in the print image process group is a process of converting a color space of image information from sRGB to CMYK (Cyan, Magenta, Yellow, Key plate).

The filtering process included in the print image process group is a process of applying various filters to image information. For example, the various filters include filters such as a filter that emphasizes an edge of image information.

The enlargement process included in the print image process group is a process of enlarging the image size of the image information to a predetermined image size.

The reduction process included in the print image process group is a process of reducing the image size of the image information to a predetermined image size.

The density conversion process included in the print image process group is a process of converting the density of the image of the image information into a predetermined density.

The black signal generation process included in the print image process group is a process of generating a black signal of image information of which color space is CMYK.

The γ correction process included in the print image process group is a process of performing gamma correction on image information.

The halftone process included in the print image process group is a process of generating a halftone image of image information by using a method such as dithering.

In the present embodiment, the print image processing unit 312 is configured with hardware. For example, the print image processing unit 312 is configured with an ASIC. The print image processing unit 312 may be configured with a program executed by the CPU included in the control unit 300.

In the image processing apparatus 100, the read image processing unit 311 and the print image processing unit 312 may be configured as one image processing unit. In this case, in the image processing apparatus 100, the read image process group and the print image process group may constitute one image process group.

Further, in the image processing apparatus 100, the read image processing unit 311 may be configured with a plurality of image processing units. In this case, the read image process group includes a plurality of image process groups. Then, each of the plurality of image process groups includes one or more read image processes.

Further, in the image processing apparatus 100, the print image processing unit 312 may be configured with a plurality of image processing units. In this case, the print image process group includes a plurality of image process groups. Then, each of the plurality of image process groups includes one or more print image processes.

The scan page memory 321 is a memory for temporarily storing image information for one page among pieces of image information read by the image reading unit 150. The scan page memory 321 is a memory separate from the memory 370 in the example illustrated in FIG. 2, but may be integrated with the memory 370.

The page memory 322 is a memory for temporarily storing image information for one page among pieces of image information on which all read image processes included in the read image process group are performed by the read image processing unit 311. That is, the page memory 322 temporarily stores the information after read image process described above. The page memory 322 is a memory separate from the memory 370 in the example illustrated in FIG. 2, but may be integrated with the memory 370.

The delay memory 330 is a delay storage device for temporarily storing image information for one page among pieces of image information on which all print image processes included in the print image process group by the print image processing unit 312 are performed. That is, the delay memory 330 temporarily stores the information after print image process described above.

The RIP 340 converts image information in a non-bitmap format into image information in a bitmap format.

The network interface 350 exchanges data with other devices. The network interface 350 operates as an input interface and receives data transmitted from another device. Also, the network interface 350 operates as an output interface and transmits data to another device.

The storage unit 360 is an auxiliary storage device such as a hard disk or a solid-state drive (SSD), for example. The storage unit 360 stores various types of information.

The memory 370 is, for example, a random-access memory (RAM). The memory 370 temporarily stores information used by each functional unit included in the image processing apparatus 100. The memory 370 may store image information read by the image reading unit 150, a program for operating each functional unit, and the like.

(Process of Storing History Information when Duplicating Target Image)

Hereinafter, a process of storing history information when the image processing apparatus 100 duplicates a target image will be described with reference to FIG. 3. The target image is an image on which the user of the image processing apparatus 100 performs image processes by the image processing apparatus 100. Therefore, the target image may be any image as long as the image is an image desired by the user.

Duplicating of the target image by the image processing apparatus 100 means that the image processing apparatus 100 reads target image information and the image processing apparatus 100 forms a target image on a sheet based on the read target image information. The target image information is image information of a target image.

When the image processing apparatus 100 duplicates a target image, the image processing apparatus 100 performs a plurality of image processes on the target image information in accordance with the duplication of the target image. Here, if a defect occurs in any of the plurality of image processes, the image processing apparatus 100 fails to duplicate the target image. Specifically, in this case, in the target image formed on the sheet by the image processing apparatus 100, a trace of a defect occurring in any of the plurality of image processes appears. For this reason, in this case, the image processing apparatus 100 needs to perform some repair.

In order to repair the image processing apparatus 100, it is necessary to specify the cause of the defect. However, if a defect occurs in any of the plurality of image processes associated with duplicating of the target image, it is often difficult to specify the cause of the defect based on the target image formed on the sheet. This is because the trace of the defect appearing in the target image formed on the sheet does not correspond to the image process causing the defect on a one-to-one basis.

Therefore, the image processing apparatus 100 stores, as history information, target image information on which one or more predetermined image processes among the plurality of image processes are performed in the process of performing the plurality of image processes. For example, when the image processing apparatus 100 sequentially performs three image processes of an image process A, an image process B, and an image process C on target image information, the image processing apparatus 100 stores three pieces of history information. The three pieces of history information are, respectively, target image information after the image process A, target image information after the image process A and the image process B, and target image information after the image processes A to C. In this case, some or all of the image process A, the image process B, and the image process C may be configured with a plurality of image processes as in the read image process group and the print image process group described above.

As a result, when a defect occurs in any of the plurality of image processes performed on the target image information, the image processing apparatus 100 can shorten the time required to specify the cause of the defect.

Figure 3:
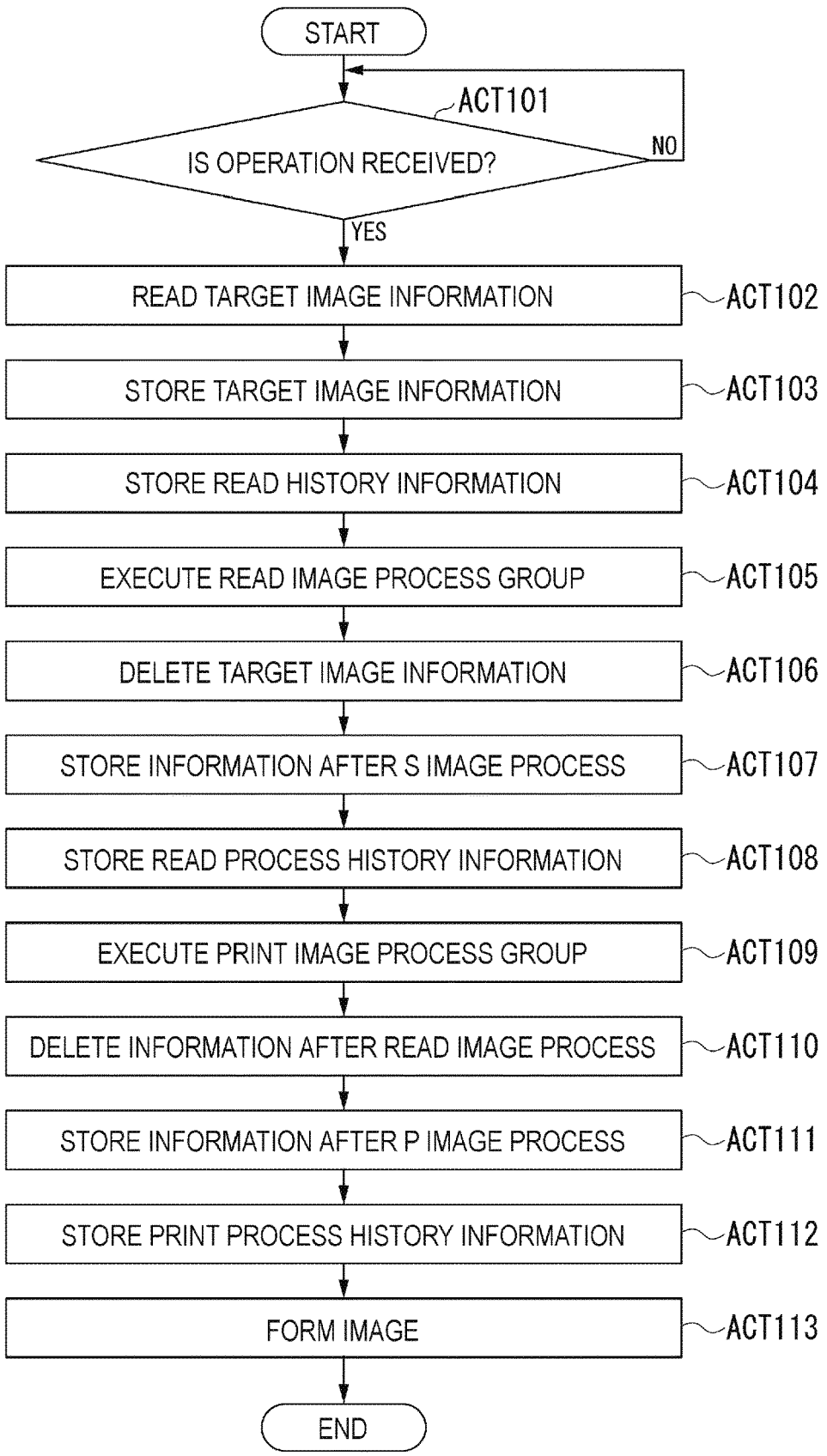
FIG. 3 is a view illustrating an example of flow of a process of storing history information in the process of duplicating a target image by the image processing apparatus.

Specifically, the image processing apparatus 100 can store the history information as described above in the process of duplicating the target image, for example, by executing the process of the flowchart illustrated in FIG. 3

FIG. 3 is a view illustrating an example of flow of a process of storing history information in the process of duplicating a target image by the image processing apparatus 100. In the following, as an example, a case will be described in which the target image is arranged so that the image reading unit 150 can read the target image information at a prior timing. The prior timing is the timing before the process of ACT 101 illustrated in FIG. 3 is performed. Also, in the following, as an example, a case will be described in which the control unit 300 receives in advance information necessary for reading the target image information via the control panel 120 at a prior timing. In the following, for convenience of description, the information will be described as read parameters. In the following, as an example, a case will be described in which the control unit 300 receives in advance information necessary for forming a target image on a sheet via the control panel 120 at a prior timing. In the following, for convenience of description, the information will be described as print parameters.

The control unit 300 stands by until an operation of starting duplicating of the target image is received (ACT 101).

If the control unit 300 determines that the operation of starting duplicating of the target image is received (ACT 101: YES), the control unit 300 causes the image reading unit 150 to read target image information from the target image (ACT 102). Here, the process in which the image processing apparatus 100 reads target image information is one of the image processes by the image processing apparatus 100. Therefore, the process in which the image processing apparatus 100 reads the target image information is an example of the first image process and the first image process group.

Next, the control unit 300 causes the scan page memory 321 to store the target image information read in ACT 102 (ACT 103). If the process in which the image processing apparatus 100 reads the target image information is an example of the first image process and the first image process group, the target image information stored in the scan page memory 321 is an example of first image information.

Next, the control unit 300 causes the storage unit 360 to store the target image information stored in the scan page memory 321 in ACT 103 as read history information (ACT 104). At this time, the control unit 300 causes the storage unit 360 to store the read history information, the read date and time information, the read information, and the target image identification information in association with each other. The read date and time information is information indicating the date and time when the image reading unit 150 reads the target image information in ACT 102. The read information is information indicating a process in which the image reading unit 150 reads image information. The target image identification information is information for identifying a target image, and is, for example, a file name of the target image information. Thus, the control unit 300 can output the read history information desired by the user to the hardware resource corresponding to the operation in accordance with the operation received from the user. When the process in which the image processing apparatus 100 reads the target image information is an example of the first image process and the first image process group, the read date and time information is an example of first date and time information. Further, when the process in which the image processing apparatus 100 reads the target image information is an example of the first image process and the first image process group, the read information is an example of first image process group information. Further, when the process in which the image processing apparatus 100 reads the target image information is an example of the first image process and the first image process group, the read history information stored in the storage unit 360 by the process of ACT 104 is an example of first history information.

Here, the hardware resource serving as an output destination to which the control unit 300 outputs various pieces of history information is hardware that at least temporarily holds the history information. For example, the hardware resource serving as the output destination may be a network cable connecting the storage device storing history information and the image processing apparatus 100, or may be the storage device. The hardware resource serving as the output destination may be a display device for displaying history information or an information processing device for acquiring history information from the image processing apparatus 100 via a network. The hardware resource serving as the output destination may be an information processing device for acquiring history information from the image processing apparatus 100 without passing through a network. Further, the hardware resource serving as the output destination may be a temporary recording medium, a non-temporary recording medium, or another hardware resource that at least temporarily holds history information. Hereinafter, for convenience of description, the hardware resource serving as the output destination will be described as a target hardware resource. Thereby, the control unit 300 can output the read history information to an information processing device in a call center or the like for the image processing apparatus 100, for example. As a result, the image processing apparatus 100 can determine whether or not a defect occurs in the process in which the image reading unit 150 reads the image information. That is, when a defect occurs in the process, the image processing apparatus 100 can shorten the time required to specify the cause of the defect.

Next, the control unit 300 performs all read image processes included in the read image process group on the target image information based on the read parameters received from the user in advance via the control panel 120 (ACT 105). Here, the target image information is target image information stored in the scan page memory 321 in ACT 103. In FIG. 3, in order to simplify the drawing, the process of ACT 105 is illustrated as "EXECUTE READ IMAGE PROCESS GROUP."

Here, the read image process group is an example of the first image process group and an example of the second image process group. When the read image process group is an example of the first image process group, the read image process is an example of the first image process. Further, when the read image process group is an example of the second image process group, the read image process is an example of the second image process.

The control unit 300 may be configured to perform the processes of ACT 104 and ACT 105 in parallel, or may be configured to perform the processes in the reverse order.

Next, after performing all read image processes included in the read image process group in ACT 105, the control unit 300 deletes the target image information stored in the scan page memory 321 (ACT 106). If the capacity of the scan page memory 321 can be increased to the extent that image information for a plurality of pages can be stored, the control unit 300 may have a configuration in which the process of ACT 106 is omitted. In this case, when outputting the read history information to the target hardware resource, the control unit 300 outputs the target image information stored in the scan page memory 321 as the read history information to the target hardware resource.

Next, the control unit 300 causes the page memory 322 to store target image information on which all read image processes included in the read image process group are performed in ACT 105 as information after read image process (ACT 107). In FIG. 3, in order to simplify the drawing, the process of ACT 107 is illustrated as "STORE INFORMATION AFTER S IMAGE PROCESS." When the read image process group is an example of the first image process group, the information after read image process is an example of the first image information.

Next, the control unit 300 causes the storage unit 360 to store the information after read image process stored in the page memory 322 in ACT 107 as read process history information (ACT 108). At this time, the control unit 300 causes the storage unit 360 to store the read process history information, read process date and time information, read image process group information, and the target image identification information in association with each other. The read process date and time information is information indicating the date and time when all read image processes included in the read image process group are performed in ACT 105. The date and time is, for example, the date and time when all the read image processes are completed, but is not limited thereto. The read image process group information is information indicating a read image process group. Thus, the control unit 300 can output the read process history information desired by the user to the above-described target hardware resource in accordance with the operation received from the user.

For example, the control unit 300 can output the read process history information to an information processing device in a call center or the like for the image processing apparatus 100. As a result, the image processing apparatus 100 can determine whether or not a defect occurs in any of one or more read image processes included in the read image process group. That is, when a defect occurs in any of the one or more read image processes, the image processing apparatus 100 can shorten the time required to specify the cause of the defect.

When each read image process performed in ACT 107 is an example of the first image process, the read process date and time information is an example of the first date and time information. When each read image process performed in ACT 107 is an example of the first image process, the read process history information stored in the storage unit 360 by the process of ACT 108 is an example of the first history information. In addition, when each read image process performed in ACT 107 is an example of the second image process, the read process history information stored in the storage unit 360 by the process of ACT 108 is an example of second history information.

Next, the control unit 300 performs all print image processes included in the print image process group on the information after read image process based on the print parameters received in advance from the user via the control panel 120 (ACT 109). Here, the information after read image process is information after read image process stored in the page memory 322 in ACT 107. In FIG. 3, in order to simplify the drawing, the process of ACT 109 is illustrated as "EXECUTE PRINT IMAGE PROCESS GROUP."

Here, the print image process group is an example of the second image process group and an example of a third image process group. Further, when the print image process group is an example of the second image process group, the print image process is an example of the second image process. Further, when the print image process group is an example of the third image process group, the print image process is an example of a third image process.

The control unit 300 may be configured to perform the processes of ACT 106 to ACT 108 in parallel, or may be configured to perform the processes in another order.

Next, after performing all print image processes included in the print image process group in ACT 109, the control unit 300 deletes the information after read image process stored in the page memory 322 (ACT 110). If the capacity of the page memory 322 can be increased to the extent that image information for a plurality of pages can be stored, the control unit 300 may have a configuration in which the process of ACT 110 is omitted. In this case, when outputting the read process history information to the target hardware resource, the control unit 300 outputs the information after read image process stored in the page memory 322 as read process history information to the target hardware resource.

Next, the control unit 300 causes the delay memory 330 to store the information after read image process on which all print image processes included in the print image process group are performed in ACT 109 as information after print image process (ACT 111). In FIG. 3, in order to simplify the drawing, the process of ACT 111 is illustrated as "STORE INFORMATION AFTER P IMAGE PROCESS."

Next, the control unit 300 causes the storage unit 360 to store the information after print image process stored in the delay memory 330 in ACT 111 as print process history information (ACT 112). At this time, the control unit 300 causes the storage unit 360 to store the print process history information, print process date and time information, print image process group information, and the target image identification information in association with each other. The print process date and time information is information indicating the date and time when all print image processes included in the print image process group are performed in ACT 109. The date and time is, for example, the date and time when all the print image processes are completed, but is not limited thereto. The print image process group information is information indicating a print image process group. Thus, the control unit 300 can output the print process history information desired by the user to the above-described target hardware resource in accordance with the operation received from the user.

Thereby, the control unit 300 can output the print process history information to an information processing device in a call center or the like for the image processing apparatus 100, for example. As a result, the image processing apparatus 100 can determine whether or not a defect occurs in any of one or more print image processes included in the print image process group. That is, when a defect occurs in any of the one or more print image processes, the image processing apparatus 100 can shorten the time required to specify the cause of the defect.

Next, the control unit 300 forms an image of the target image information on a sheet based on the information after print image process stored in the delay memory 330 in ACT 111 (ACT 113). More specifically, the control unit 300 controls the printer unit 130 in ACT 113 to form an image of the information after print image process on a sheet as an image of the target image information. Then, the control unit 300 ends the process.

Figure 4:
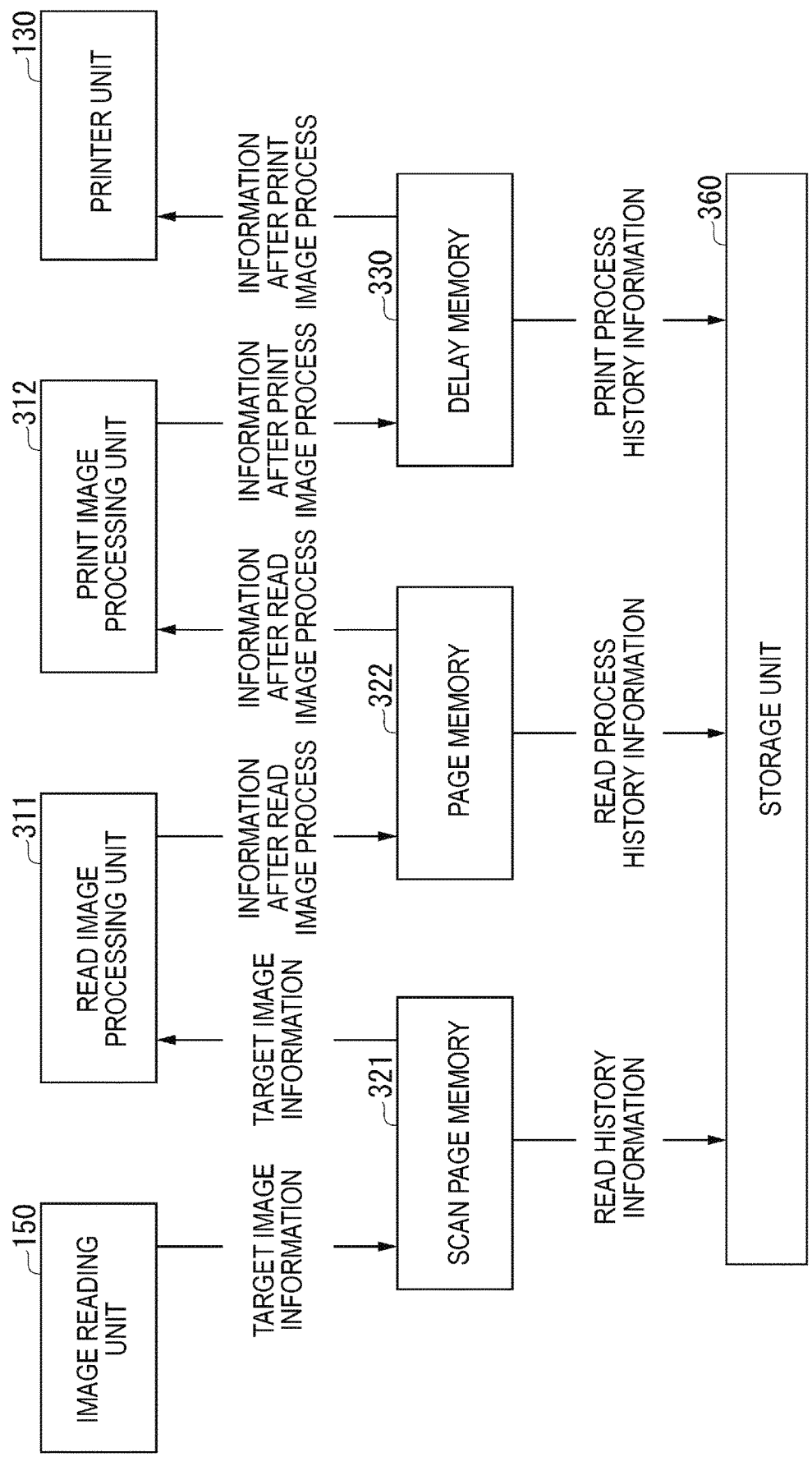
FIG. 4 is a view illustrating a data flow in the process of a flowchart illustrated in FIG. 3.

Here, FIG. 4 is a view illustrating a data flow in the process of the flowchart illustrated in FIG. 3. As illustrated in FIG. 4, in the process, the target image information is stored in the scan page memory 321 after being read by the image processing apparatus 100. Then, the target image information stored in the scan page memory 321 is output to each of the storage unit 360 and the read image processing unit 311.

The target image information output to the storage unit 360 is stored in the storage unit 360 as read history information. Meanwhile, the target image information output to the read image processing unit 311 is converted into information after read image process by the read image processing unit 311. Thereafter, the information after read image process is output to the page memory 322. Then, the information after read image process stored in the page memory 322 is output to each of the storage unit 360 and the print image processing unit 312.

The information after read image process output to the storage unit 360 is stored in the storage unit 360 as read process history information. Meanwhile, the information after read image process output to the print image processing unit 312 is converted into information after print image process by the print image processing unit 312. Thereafter, the information after print image process is output to the delay memory 330. Then, the information after print image process stored in the delay memory 330 is output to each of the storage unit 360 and the printer unit 130.

The information after print image process output to the storage unit 360 is stored in the storage unit 360 as print process history information. Meanwhile, the information after print image process output to the printer unit 130 is used for forming the target image on a sheet by the printer unit 130.

As described above, the image processing apparatus 100 stores three pieces of history information of read history information, read process history information, and print process history information in the process of duplicating the target image by the process of the flowchart illustrated in FIG. 3. As a result, when a defect occurs in any of the plurality of image processes performed on the target image information, the image processing apparatus 100 can shorten the time required to specify the cause of the defect.

(Process of Storing History Information when Printing Target Image)

Hereinafter, a process of storing history information when the image processing apparatus 100 prints a target image will be described with reference to FIG. 5.

Printing of the target image by the image processing apparatus 100 means that the image processing apparatus 100 forms the target image on a sheet based on the target image information. Therefore, normally, the printing of the target image by the image processing apparatus 100 also includes the duplicating of the target image by the image processing apparatus 100, as described above. However, in the embodiment, for convenience of description, the formation of the target image on a sheet by the image processing apparatus 100 without reading the target image information by the image reading unit 150 will be described as the printing of the target image by the image processing apparatus 100. Therefore, for example, the image processing apparatus 100 prints the target image based on the target image information stored in advance in the storage unit 360 in the printing of the target image. Further, for example, in the printing of the target image, the image processing apparatus 100 prints the target image based on the target image information acquired from another device via the network. The image processing apparatus 100 may be configured to print the target image based on the target image information acquired by another method in the printing of the target image. Hereinafter, as an example, a case will be described in which the image processing apparatus 100 prints a target image based on target image information stored in advance in the storage unit 360.

Therefore, the image processing apparatus 100 stores, as history information, target image information on which one or more predetermined image processes among the plurality of image processes are performed even in the process of performing the plurality of image processes associated with printing of the target image. As a result, when a defect occurs in any of the plurality of image processes performed on the target image information, the image processing apparatus 100 can shorten the time required to specify the cause of the defect.

Figure 5:
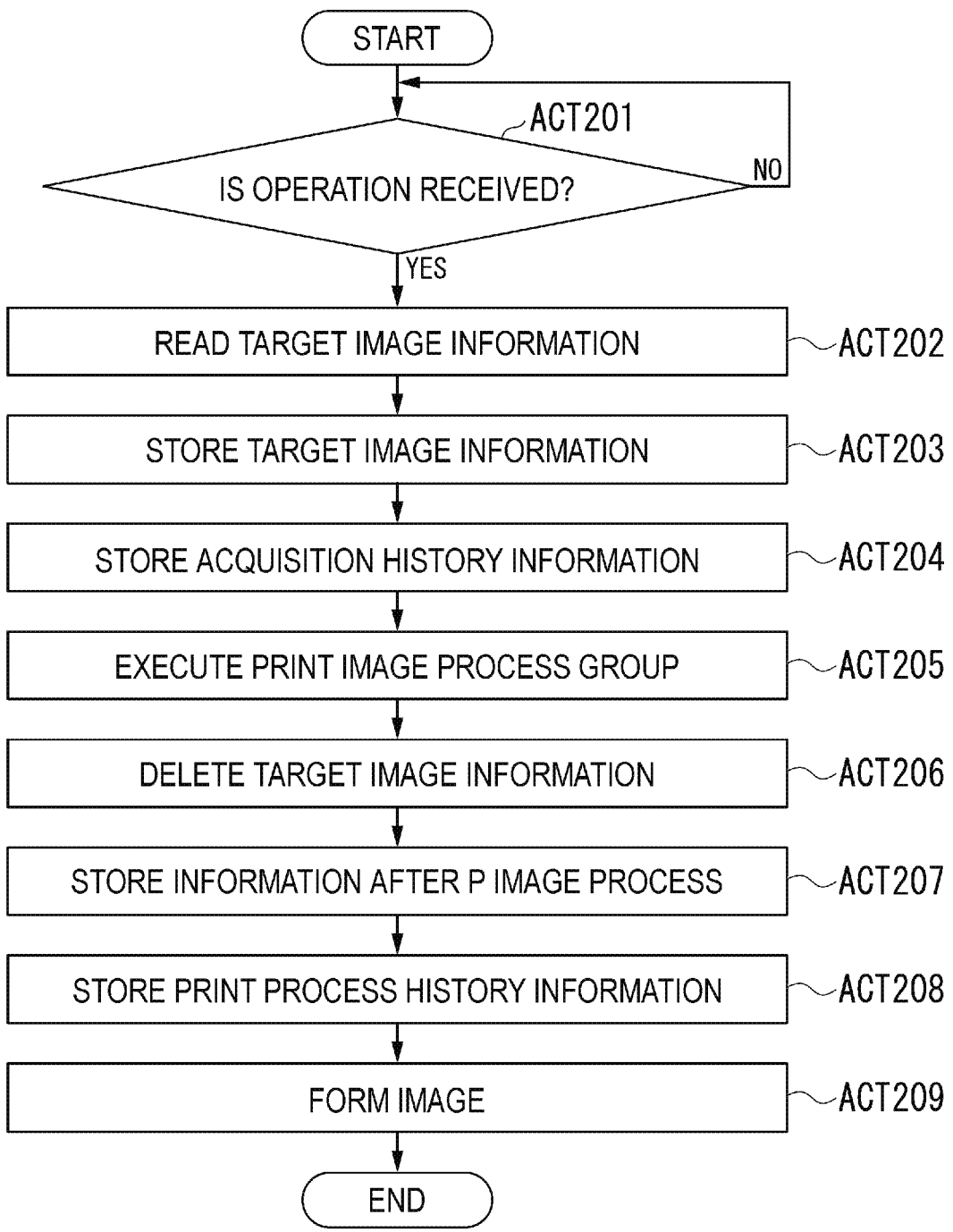
FIG. 5 is a view illustrating an example of flow of a process of storing history information in the process of printing a target image by the image processing apparatus.

Specifically, the image processing apparatus 100 can store the history information as described above in the process of printing the target image, for example, by executing the process of the flowchart illustrated in FIG. 5

FIG. 5 is a view illustrating an example of flow of a process of storing history information in the process of printing a target image by the image processing apparatus 100. Hereinafter, as an example, a case will be described in which the target image information is stored in advance in storage unit 360 at a prior timing. The prior timing is the timing before the process of ACT 201 illustrated in FIG. 5 is performed. In the following, as an example, a case will be described in which the control unit 300 receives the above-described print parameters in advance via the control panel 120 at a prior timing.

The control unit 300 stands by until an operation of starting duplicating of the target image is received (ACT 201).

If the control unit 300 determines that an operation of starting printing of the target image is received (ACT 201: YES), the control unit 300 reads the target image information stored in the storage unit 360 from the storage unit 360 (ACT 202). That is, in ACT 102, the control unit 300 acquires target image information. Here, the process in which the image processing apparatus 100 acquires target image information is one of the image processes by the image processing apparatus 100. Thus, the process in which the image processing apparatus 100 acquires target image information is an example of the first image process and the first image process group.

Next, the control unit 300 causes the page memory 322 to store the target image information read in ACT 202 (ACT 203). If the process in which the image processing apparatus 100 acquires the target image information is an example of the first image process and the first image process group, the target image information stored in the page memory 322 is an example of the first image information.

Next, the control unit 300 causes the storage unit 360 to store the target image information stored in the page memory 322 in ACT 203 as acquisition history information (ACT 204). At this time, the control unit 300 causes the storage unit 360 to store the acquisition history information, acquisition date and time information, acquisition information, and the target image identification information in association with each other. The acquisition date and time information is information indicating the date and time when the control unit 300 acquires target image information in ACT 202. The acquisition information is information indicating a process in which the control unit 300 acquires image information. Thus, the control unit 300 can output acquisition history information desired by the user to the target hardware resource in accordance with the operation received from the user.

For example, the control unit 300 can output the acquisition history information to an information processing device in a call center or the like for the image processing apparatus 100. As a result, the image processing apparatus 100 can determine whether or not a defect occurs in the process in which the control unit 300 acquires image information. That is, when a defect occurs in the process in which the control unit 300 acquires image information, the image processing apparatus 100 can shorten the time required to specify the cause of the defect.

When the process in which the control unit 300 acquires image information is an example of the first image process and the first image process group, the acquisition date and time information is an example of the first date and time information. When the process in which the control unit 300 acquires the image information is an example of the first image process and the first image process group, the acquisition information is an example of the first image process group information. When the process in which the control unit 300 acquires the image information is an example of the first image process and the first image process group, the acquisition history information stored in the storage unit 360 by the process of ACT 204 is an example of the first history information.

Next, the control unit 300 performs all print image processes included in the print image process group on the target image information based on the print parameters received in advance from the user via the control panel 120 (ACT 205). Here, the target image information is the target image information stored in the page memory 322 in ACT 203. In FIG. 5, in order to simplify the drawing, the process of ACT 205 is illustrated as "EXECUTE PRINT IMAGE PROCESS GROUP."

Here, the print image process group is an example of the second image process group. For this reason, the print image process is an example of the second image process.

The control unit 300 may be configured to perform the processes of ACT 204 and ACT 205 in parallel, or may be configured to perform the processes in the reverse order.

Next, after performing all print image processes included in the print image process group in ACT 205, the control unit 300 deletes the target image information stored in the page memory 322 (ACT 206). If the capacity of the page memory 322 can be increased to the extent that image information for a plurality of pages can be stored, the control unit 300 may have a configuration in which the process of ACT 206 is omitted. In this case, when outputting the acquisition history information to the target hardware resource, the control unit 300 outputs the target image information stored in the page memory 322 as the acquisition history information to the target hardware resource.

Next, the control unit 300 causes the delay memory 330 to store the target image information on which all print image processes included in the print image process group are performed in ACT 206 as information after print image process (ACT 207). In FIG. 5, in order to simplify the drawing, the process of ACT 207 is illustrated as "STORE INFORMATION AFTER P IMAGE PROCESS."

Next, the control unit 300 causes the storage unit 360 to store the information after print image process stored in the delay memory 330 in ACT 207 as print process history information (ACT 208). At this time, the control unit 300 causes the storage unit 360 to store the print process history information, print process date and time information, print image process group information, and the target image identification information in association with each other. The print process date and time information is information indicating the date and time when all print image processes included in the print image process group are performed in ACT 207. The date and time is, for example, the date and time when all the print image processes are completed, but is not limited thereto. The print image process group information is information indicating a print image process group. Thus, the control unit 300 can output the print process history information desired by the user to the above-described target hardware resource in accordance with the operation received from the user.

For example, the control unit 300 can output the print process history information to an information processing device in a call center or the like for the image processing apparatus 100. As a result, the image processing apparatus 100 can determine whether or not a defect occurs in any of one or more print image processes included in the print image process group. That is, when a defect occurs in any of the one or more print image processes, the image processing apparatus 100 can shorten the time required to specify the cause of the defect.

Next, the control unit 300 forms an image of the target image information on a sheet based on the information after print image process stored in the delay memory 330 in ACT 208 (ACT 209). More specifically, the control unit 300 controls the printer unit 130 in ACT 209 to form an image of the information after print image process on a sheet as an image of the target image information. Then, the control unit 300 ends the process.

Figure 6:
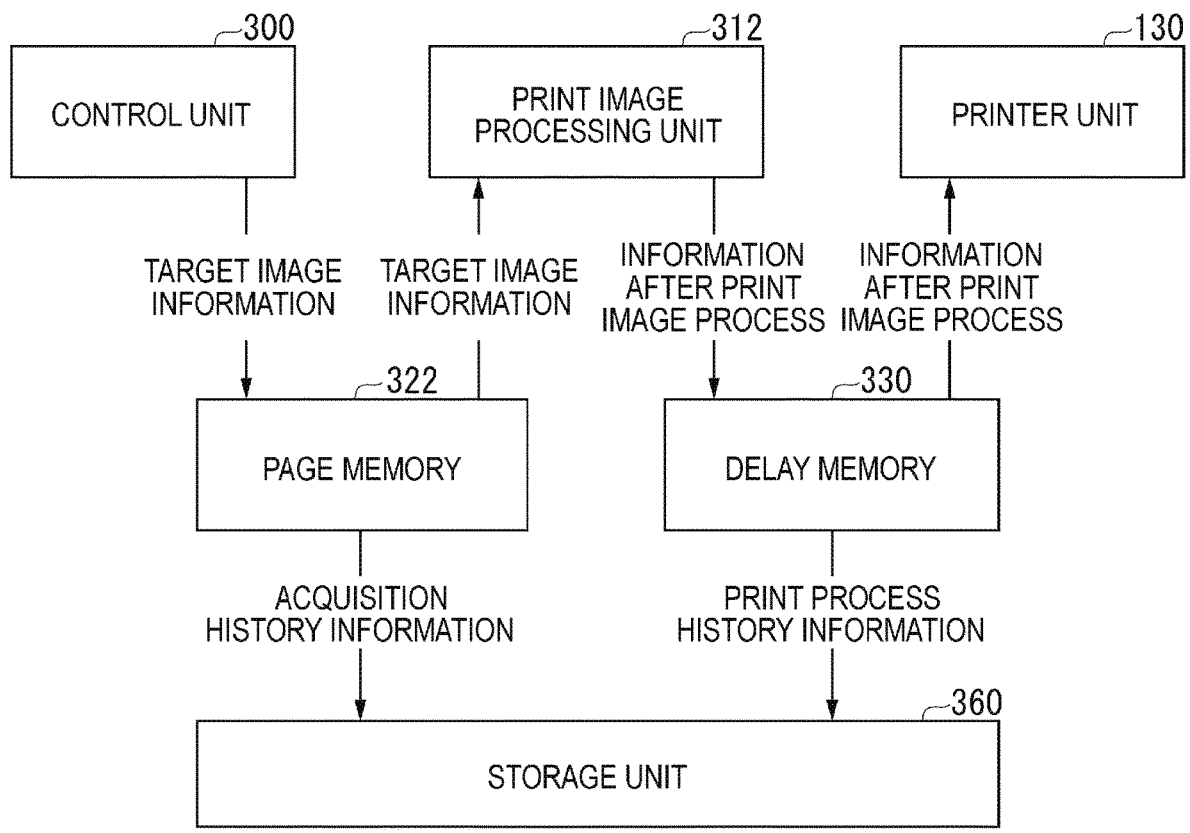
FIG. 6 is a view illustrating a data flow in the process of a flowchart illustrated in FIG. 5.

Here, FIG. 6 is a view illustrating a data flow in the process of the flowchart illustrated in FIG. 5. As illustrated in FIG. 6, in the process, the target image information is stored in the page memory 322 after being acquired by the image processing apparatus 100. Then, the target image information stored in the page memory 322 is output to each of the storage unit 360 and the print image processing unit 312.

The target image information output to the storage unit 360 is stored in the storage unit 360 as acquisition history information. Meanwhile, the target image information output to the print image processing unit 312 is converted into information after print image process by the print image processing unit 312. Thereafter, the information after print image process is output to the delay memory 330. Then, the information after print image process stored in the delay memory 330 is output to each of the storage unit 360 and the printer unit 130.

The information after print image process output to the storage unit 360 is stored in the storage unit 360 as print process history information. Meanwhile, the information after print image process output to the printer unit 130 is used for forming the target image on a sheet by the printer unit 130.

As described above, the image processing apparatus 100 stores two pieces of history information of acquisition history information and print process history information in the process of printing the target image by the process of the flowchart illustrated in FIG. 5. As a result, when a defect occurs in any of the plurality of image processes performed on the target image information, the image processing apparatus 100 can shorten the time required to specify the cause of the defect.

The image processing apparatus 100 may be configured to perform all image processes included in the image process group for every four or more image process groups and causes the storage unit 360 to store the image information on which all the image processes are performed, as history information. In other words, the image processing apparatus 100 causes the storage unit 360 to store the image information on which the image process is performed, as history information, each time one or more predetermined image processes are performed among the plurality of image processes in the process of performing the plurality of image processes. As a result, when a defect occurs in any of the plurality of image processes performed on the target image information, the image processing apparatus 100 can shorten the time required to specify the cause of the defect.

(Process of Deleting History Information)

Hereinafter, a process in which the image processing apparatus 100 deletes history information will be described with reference to FIG. 7.

As described above, the image processing apparatus 100 causes the storage unit 360 to store history information when performing a plurality of image processes. However, when the image processing apparatus 100 does not delete the history information stored in the storage unit 360, the data amount of the history information stored in the storage unit 360 monotonically increases. In order to avoid this, the image processing apparatus 100 performs a process of deleting the history information in which a predetermined condition is satisfied, from the storage unit 360. Specifically, the image processing apparatus 100 performs a process of deleting the history information in which a predetermined condition is satisfied from the storage unit 360 by executing the process of the flowchart illustrated in FIG. 7.

Figure 7:
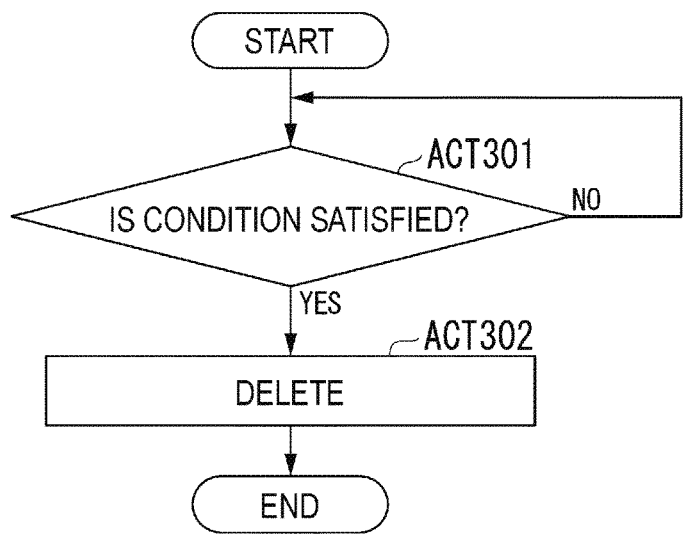
FIG. 7 is a view illustrating an example of flow of a process in which the image processing apparatus deletes history information.

FIG. 7 is a view illustrating an example of flow of a process in which the image processing apparatus 100 deletes history information. The image processing apparatus 100 performs the process of the flowchart illustrated in FIG. 7 for each piece of history information stored in the storage unit 360. In the following, for convenience of description, history information to be subjected to the process of the flowchart illustrated in FIG. 7 will be described as target history information. Here, in the example described above, the history information to be target history information is read history information, read process history information, print process history information, and acquisition history information.

The control unit 300 stands by until a predetermined condition is satisfied for the target history information (ACT 301). Here, the predetermined condition is, for example, that a predetermined holding time elapses from the time when the target history information is stored in the storage unit 360. Alternatively, the predetermined condition may be another condition. The holding time is, for example, 168 hours (one week). The holding time may be shorter than 168 hours or longer than 168 hours. The holding time is determined, for example, according to the time required from when the user notices a defect in the image process to when some kind of countermeasure is taken.

If the control unit 300 determines that the predetermined condition is satisfied for the target history information (ACT 301: YES), the control unit 300 deletes the target history information stored in the storage unit 360 (ACT 302) and ends the process.

As described above, the image processing apparatus 100 deletes history information in which the predetermined condition is satisfied, from the storage unit 360. Thus, the image processing apparatus 100 can suppress the storage capacity of the storage unit 360 from being compressed due to the history information.

(Process of Outputting History Information to Target Hardware Resource)

Figure 8:
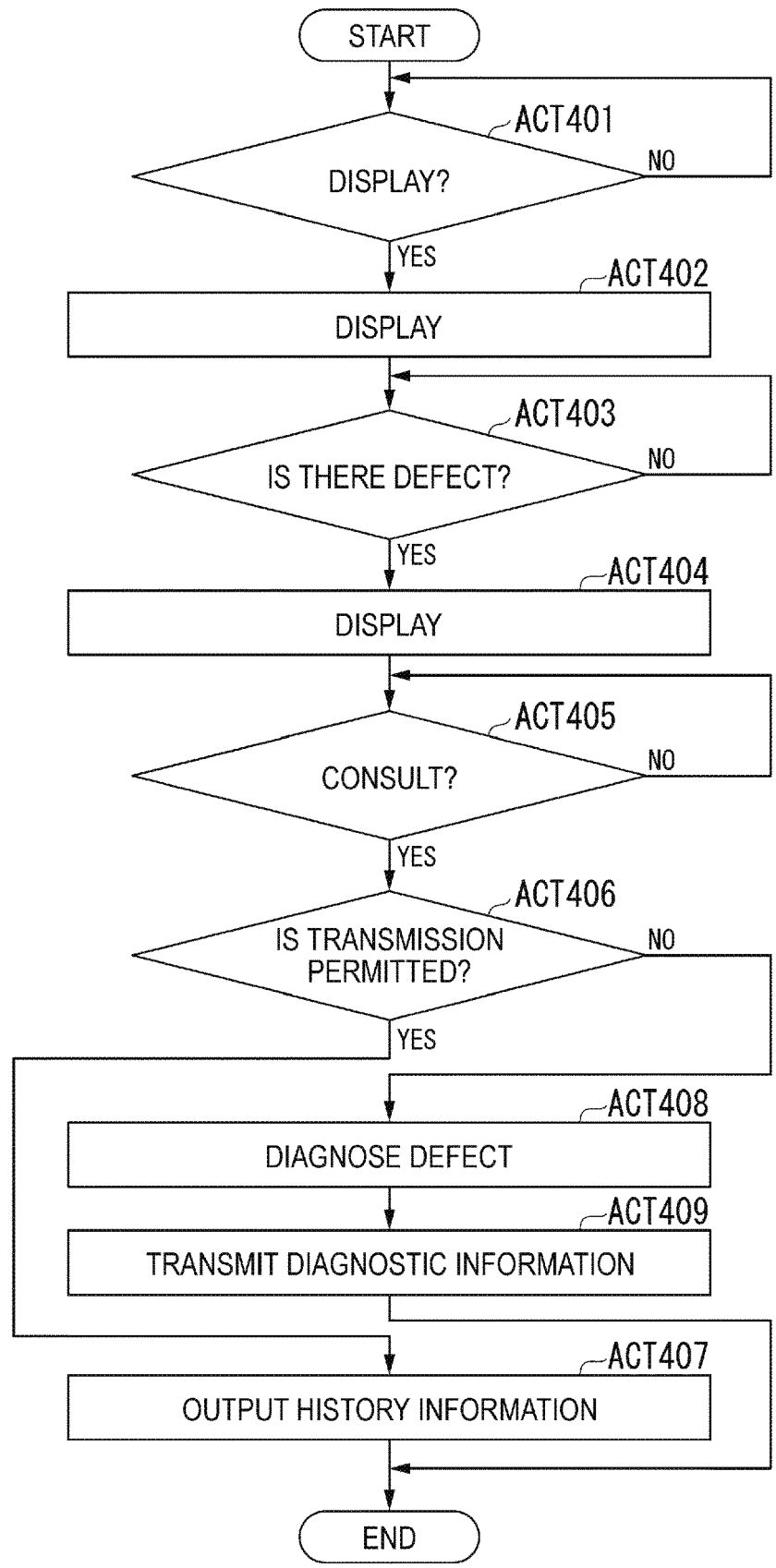
FIG. 8 is a view illustrating an example of flow of a process in which the image processing apparatus outputs history information to another apparatus.

Hereinafter, a process in which the image processing apparatus 100 outputs history information to a target hardware resource will be described with reference to FIG. 8. FIG. 8 is a view illustrating an example of flow of a process in which the image processing apparatus 100 outputs history information to a target hardware resource. Hereinafter, as an example, a process in which the image processing apparatus 100 outputs history information to an information processing device in a call center of the image processing apparatus 100 will be described as an example. In the following, as an example, a case will be described in which the image processing apparatus 100 receives the target image identification information associated with the history information to be transmitted to the information processing device from the user in advance.

The control unit 300 stands by until an operation of displaying a help menu image on the display 110 is received from the user via the control panel 120 (ACT 401). The help menu image is an image that accepts an operation from the user, and is an image that displays a solution to a problem occurring in the image processing apparatus 100.

If the control unit 300 determines that an operation of displaying a help menu image on the display 110 is received from the user (ACT 401: YES), the process proceeds to ACT 402. Then, the control unit 300 causes the display 110 to display the help menu image (ACT 402).

Next, the control unit 300 stands by until an operation indicating that there is a defect in the target image formed on the sheet is received via the help menu image (ACT 403). In FIG. 8, in order to simplify the description, the process performed by the control unit 300 when an operation different from the operation is received via the help menu image is omitted.

When the control unit 300 determines that the operation indicating that there is a defect in the target image formed on the sheet is received (ACT 403: YES), the process proceeds to ACT 404. Then, the control unit 300 causes the display 110 to display an image troubleshooting menu image (ACT 404). The image troubleshooting menu image is an image that displays a solution when there is a defect in the target image formed on the sheet.

Next, the control unit 300 stands by until an operation indicating consultation with the call center is received via the image troubleshooting menu image (ACT 405). In FIG. 8, in order to simplify the description, the process performed by the control unit 300 when an operation different from the operation is received via the image troubleshooting menu image is omitted.

When the control unit 300 determines that the operation indicating the consultation with the call center is received (ACT 405: YES), the process proceeds to ACT 407. In ACT 407, the control unit 300 causes the display 110 to display an image that accepts either an operation for permitting transmission of history information or an operation for not permitting transmission of history information. Then, the control unit 300 determines which of the operation for permitting transmission of the history information and the operation for not permitting transmission of the history information is received (ACT 406).

If the control unit 300 determines that the operation for permitting transmission of the history information is received (ACT 406: YES), the process proceeds to ACT 407. Then, the control unit 300 outputs the history information associated with the target image identification information received in advance to the information processing device in the call center (ACT 407) and ends the process.

Meanwhile, when the control unit 300 determines that an operation for not permitting transmission of the history information is received (ACT 406: NO), the process proceeds to ACT 408. Then, based on the target image identification information received in advance, the control unit 300 performs self-diagnosis as to whether or not a defect occurs in a plurality of image processes performed on the target image information indicated by the target image identification information. Such a method by which the control unit 300 performs self-diagnosis of a defect may be a known method or a method to be developed from now on.

Next, the control unit 300 outputs diagnostic information indicating the result of the self-diagnosis performed in ACT 408 to the information processing device in the call center (ACT 409) and ends the process. The control unit 300 may be configured to acquire a response from the user to a questionnaire for the user in ACT 408. The questionnaire is a questionnaire about a defect. In this case, the control unit 300 outputs information indicating the response to the information processing device in ACT 409.

As described above, the image processing apparatus 100 outputs the history information to the target hardware resource. As a result, in a case of the image processing apparatus 100, the technician does not need to come to the place where the image processing apparatus 100 is installed in order to specify the cause of the defect. As a result, when a defect occurs in any of the plurality of image processes performed on the target image information, the image processing apparatus 100 can shorten the time required to specify the cause of the defect.

(Method for Specifying Image Process Causing Defect Based on History Information by Technician)

Hereinafter, a method for specifying an image process causing a defect based on history information by the technician will be described with reference to FIG. 9. Here, the technician is, for example, a technician belonging to the call center of the image processing apparatus 100, a company that manufactures the image processing apparatus 100, or the like. The technician specifies the image process causing the defect based on the history information, for example, by executing the process of the flowchart illustrated in FIG. 9.

Figure 9:
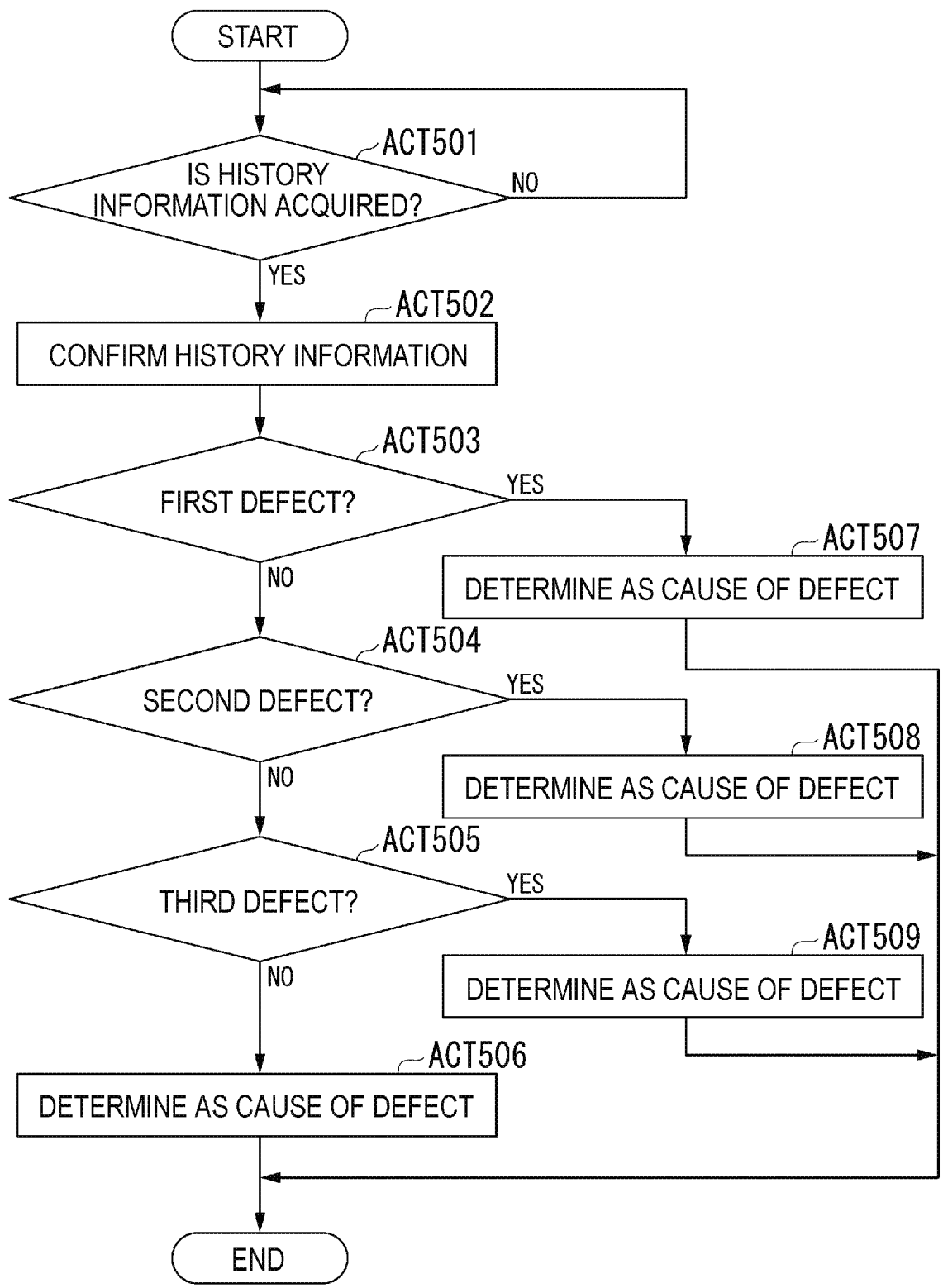
FIG. 9 is a view illustrating an example of flow of a process in which a technician specifies an image process causing a defect based on history information.

FIG. 9 is a view illustrating an example of flow of a process in which a technician specifies an image process causing a defect based on history information. Hereinafter, as an example, three pieces of history information stored in the storage unit 360 in the process of the flowchart illustrated in FIG. 3 will be described as an example. That is, in FIG. 9, flow of a process in which the technician specifies the image process causing the defect based on the three pieces of history information stored when the image processing apparatus 100 duplicates the target image will be described.

The technician stands by until three pieces of history information are acquired via the information processing device in the call center or the like (ACT 501).

When the technician acquires three pieces of history information (ACT 501: YES), the technician confirms each of the acquired three pieces of history information (ACT 502). Then, the technician specifies the history information in which a defect occurs from among the three pieces of history information. For example, the technician causes the display of the information processing device to display read history information and specifies whether or not a defect occurs in the read history information based on the read history information displayed on the display. Further, for example, the technician causes the display of the information processing device to display the read process history information and specifies whether or not a defect occurs in the read process history information based on the read process history information displayed on the display. For example, the technician causes the display of the information processing device to display print process history information and specifies whether or not a defect occurs in the print process history information based on the print process history information displayed on the display.

Next, based on the confirmation result of ACT 502, the technician determines whether or not a defect occurs in the history information of the oldest date and time among the three pieces of history information acquired in ACT 501 (ACT 503). In FIG. 9, in order to simplify the drawing, the process of ACT 503 is illustrated as "FIRST DEFECT?" In this example, history information of the oldest date and time among the three pieces of history information is read history information.

If the technician determines that a defect occurs in the read history information (ACT 503: YES), the technician specifies that the defect occurs in the image process in which the image reading unit 150 reads the image information. That is, the technician specifies that the image process is the cause of the defect (ACT 507) and ends the process.

On the other hand, when the technician determines that the defect does not occur in the read history information (ACT 503: NO), the process proceeds to ACT 504. Then, based on the confirmation result of ACT 502, the technician determines whether or not a defect occurs in the history information of the second oldest date and time among the three pieces of history information acquired in ACT 501 (ACT 504). In FIG. 9, in order to simplify the drawing, the process of ACT 504 is illustrated as "SECOND DEFECT?" In this example, the history information of the second oldest date and time among the three pieces of history information is the read process history information.

If the technician determines that a defect occurs in the read process history information (ACT 504: YES), the technician specifies that the defect occurs in any one of all the image processes included in the read image process group. That is, the technician specifies that any one of all the image processes included in the read image process group is the cause of the defect (ACT 508) and ends the process.

On the other hand, when the technician determines that the defect does not occur in the read process history information (ACT 504: NO), the process proceeds to ACT 505. Then, based on the confirmation result of ACT 502, the technician determines whether or not a defect occurs in history information of the latest date and time among the three pieces of history information acquired in ACT 501 (ACT 505). In FIG. 9, in order to simplify the drawing, the process of ACT 505 is illustrated as "THIRD DEFECT?" In this example, history information of the latest date and time among the three pieces of history information is print process history information.

If the technician determines that a defect occurs in the print process history information (ACT 505: YES), the technician specifies that the defect occurs in any one of all the image processes included in the print image process group. That is, the technician specifies that any one of all the image processes included in the print image process group is the cause of the defect (ACT 509) and ends the process.

On the other hand, when the technician determines that the defect does not occur in the print process history information (ACT 505: NO), the process proceeds to ACT 506. Then, the technician specifies that the image process in which the printer unit 130 forms the target image on a sheet is the cause of the defect (ACT 506) and ends the process.

As described above, the technician can specify the image process causing the defect based on the history information. As a result, the technician can quickly specify the image process in which a defect occurs as compared with the case where there is no history information.

The technician may specify the image process causing the defect based on a combination of results of whether or not a defect occurs in each of read history information, read process history information, and print process history information.

The process of the flowchart illustrated in FIG. 9 may be performed by the information processing device by using machine learning or the like. In this case, the process may be performed by the control unit 300.

As described above, an image processing apparatus (in this example, the image processing apparatus 100) is an image processing apparatus that performs a plurality of image processes on target image information with the image information of a target image as the target image information. The image processing apparatus has a control unit (in the example described above, the control unit 300). The plurality of image processes include a first image process group including one or more first image processes, and a second image process group including one or more second image processes. The one or more second image processes do not overlap with the one or more first image processes. The control unit performs all the first image processes included in the first image process group on the target image information, causes a first storage unit (in the example described above, the storage unit 360) to store the target image information on which all the first image processes included in the first image process group are performed as first history information, performs all the second image processes included in the second image process group on the target image information on which all the first image processes included in the first image process group are performed, and outputs the first history information to a hardware resource (in the example described above, the target hardware resource), and the hardware resource at least temporarily holds the first history information. As a result, when a defect occurs in any of the plurality of image processes performed on the target image information, the image processing apparatus can shorten the time required to specify the cause of the defect.

Further, the image processing apparatus deletes the first history information stored in the first storage unit when a predetermined condition is satisfied. As a result, the image processing apparatus can suppress the capacity of the first storage unit from being compressed due to the first history information stored in the first storage unit.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus that performs a plurality of image processes on target image information with image information of a target image as the target image information, the apparatus comprising:
   a control unit, wherein
   the plurality of image processes include a first image process group including one or more first image processes, and a second image process group including one or more second image processes,
   the one or more second image processes do not overlap with the one or more first image processes,
   the control unit is configured to:
      perform the first image processes included in the first image process group on the target image information,
      instruct a first storage unit to store the target image information on which all the first image processes included in the first image process group have been performed, as first history information,
      perform all the second image processes included in the second image process group on the target image information on which all the first image processes included in the first image process group have been performed, and
      output the first history information to a hardware resource other than the first storage unit, wherein the hardware resource is configured to at least temporarily hold the first history information,
      wherein the control unit causes the first storage unit to store information in which first image process group information indicating the first image process group, first date and time information indicating date and time when the first image process group is performed, target image identification information for identifying the target image information, and the first history information are associated with each other.

2. The apparatus according to claim 1, further comprising:
   a second storage unit configured to temporarily store image information, wherein the control unit is further configured to:
      perform the first image processes included in the first image process group, and then instruct the second storage unit to store the target image information on which all the first image processes included in the first image process group are performed, as first image information,
instruct the first storage unit to store the first image information stored in the second storage unit as the first history information, and
perform all the second image processes included in the second image process group on the first image information stored in the second storage unit.

3. The apparatus according to claim 2, wherein the control unit deletes the first image information stored in the second storage unit after the first history information is stored in the first storage unit, and then the second image process group is performed on the first image information.

4. The apparatus according to claim 1, wherein the hardware resource is an information processing device operable to acquire the first history information from the image processing apparatus via a network.

5. The apparatus according to claim 1, wherein the hardware resource includes at least one of a display device that displays the first history information, a storage device that stores the first history information, and an information processing device that acquires the first history information.

6. The apparatus according to claim 1, wherein the control unit deletes the first history information stored in the first storage unit when a predetermined condition is satisfied.

7. The apparatus according to claim 6, wherein the predetermined condition is satisfied when a predetermined holding time has elapsed from an initial time when the first history information is stored in the first storage unit.

8. The apparatus according to claim 1, wherein the plurality of image processes further includes a third image process group including one or more third image processes, the one or more third image processes not overlapping with the one or more first image processes or the one or more second image processes,
after the second image process group is performed on the target image information, the control unit is configured to:
instruct the first storage unit to store the target image information on which the second image process group is performed, as second history information,
perform the third image process group on the target image information on which the second image process group is performed, and
output the second history information to the hardware resource.

9. A method for detecting and locating defect occurrence during image processing of a target image, the method comprising:
performing a first image process group on a target image including one or more first image processes;
saving a first history information of the performed one or more first image processes of the first image process group on the target image,
performing, after saving the first history information, a second image process group on the target image including one or more second image processes, the one or more second image processes different from the one or more first image processes;
detecting a defect occurrence in the target image; and
determining whether the defect occurred during performance of the first image process group or the second image process group based upon whether the defect appears in the first history information.

10. The method of claim 9, further comprising storing acquisition history information.

11. The method of claim 10, further comprising storing print process history information.

12. The method of claim 11, wherein determining in which of the first image process group and the second image process group the defect has occurred further comprises examining the acquisition history information and the print process history information.

13. The method of claim 9, wherein the one or more first image processes and the one or more second image processes include at least one of a color conversion process, a filtering process, an enlargement process, a reduction process, a density conversion process, a compression process, a black signal generation process, a gamma correction process, and a halftone process.

14. A method for monitoring defect occurrence during image processing, the method comprising:
reading target image information;
storing read history information of the reading of the target image information;
executing a first image process group including one or more first image processes;
storing a first history information of the execution of the first image process group;
executing a second image process group including one or more second image processes, the second image process group being different from the first image process group; storing a second history information of the execution of the second image process group; and
upon a detection of a defect, reviewing the stored read history information, the first history information, and the second history information to identify one or more processes associated with the defect.

15. The method of claim 14, wherein the first image process group is a read image process group and wherein the one or more first image processes include at least one of a color conversion process, a filtering process, an enlargement process, a reduction process, a density conversion process, or a compression process.

16. The method of claim 14, wherein the second image process group is a print image process group and wherein the one or more second image processes include at least one of a color conversion process, a filtering process, an enlargement process, a reduction process, a density conversion process, a black signal generation process, a gamma correction process, and a halftone process.

17. The method of claim 14, further comprising: storing the target image information upon reading the target image information in a scan page memory;
storing a result after the execution of the first image process group in a page memory; and
storing a result after the execution of the second image process group in a delay memory.

18. The method of claim 17, further comprising:
deleting the target image information after execution of the first image process group;
deleting the result after the execution of the first image process group after execution of the second image process group; and
forming an image of the target image information.

19. The method of claim 14, wherein reviewing the stored read history information, the first history information, and the second history information to identify one or more processes associated with the defect comprises:
determining whether a transmission of the stored read history information, the first history information, and the second history information is permitted;

upon a determination that the transmission of the stored read history information, the first history information, and the second history information is permitted, sending the stored read history information, the first history information, and the second history information to a call center; and upon a determination that the transmission of the stored read history information, the first history information, and the second history information is not permitted, performing diagnosis of the defect based on the stored read history information, the first history information, and the second history information and outputting diagnostic information.

\* \* \* \* \*